(12) United States Patent
Morris

(10) Patent No.: US 11,499,892 B2
(45) Date of Patent: Nov. 15, 2022

(54) OPTIMIZATION FOR ANOMALY DETECTION

(71) Applicant: KCF TECHNOLOGIES, INC., State College, PA (US)

(72) Inventor: Montana Morris, Pittsburgh, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 73 days.

(21) Appl. No.: 17/106,819

(22) Filed: Nov. 30, 2020

(65) Prior Publication Data

US 2022/0170823 A1    Jun. 2, 2022

(51) Int. Cl.
*G01M 99/00* (2011.01)
*G06N 20/00* (2019.01)

(52) U.S. Cl.
CPC .......... *G01M 99/005* (2013.01); *G06N 20/00* (2019.01)

(58) Field of Classification Search
CPC ............................. G01M 99/005; G06N 20/00
See application file for complete search history.

(56) References Cited

U.S. PATENT DOCUMENTS

| | | | |
|---|---|---|---|
| 2004/0039968 A1 | 2/2004 | Hatonen et al. | |
| 2006/0259163 A1* | 11/2006 | Hsiung | G05B 23/0254 700/30 |
| 2020/0112577 A1 | 4/2020 | Han et al. | |

FOREIGN PATENT DOCUMENTS

| | | |
|---|---|---|
| EP | 1725919 B1 | 4/2014 |
| EP | 3379357 A1 | 9/2018 |

OTHER PUBLICATIONS

Search Report dated Mar. 3, 2022 in corresponding International Application No. PCT/US2021/061065, 2 pages.
Written Opinion dated Mar. 3, 2022 in corresponding International Application No. PCT/US2021/061065, 6 pages.

* cited by examiner

*Primary Examiner* — Manuel A Rivera Vargas
(74) *Attorney, Agent, or Firm* — MH2 Technology Law Group LLP

(57) ABSTRACT

A computer-implemented method, a system, and at least one computer-readable storage device are provided. A measured value related to operation of a device is periodically received for each respective reporting period. If the measured value indicates unhealthy operation of the device, a distance of the measured value from a predetermined abnormal threshold is determined and stored in a data store. Based on the determined distance, a number of most recent reporting periods included in a window is determined. All stored distances determined from measured values received before the window of the most recent reporting periods are deleted from the data store. An occurrence of a device failure is determined based on the stored distances in the data store after the deleting. In response to determining the occurrence of the device failure, an action is performed.

20 Claims, 4 Drawing Sheets

OPTIMIZATION FOR ANOMALY DETECTION

TECHNICAL FIELD

This disclosure relates to determining whether a device failure occurred or an impending device failure is about to occur based on periodically received and stored data relating to current operational conditions of the device. More particularly, this disclosure relates to determining whether a device failure occurred or an impending device failure is about to occur based on a determined number of most recent periodically received and stored data regarding the operational conditions of the device.

BACKGROUND

Devices, including but not limited to pumps, may exhibit anomalous behavior that may indicate an oncoming or occurring device failure. A failure or impending failure detected early may be resolved by placing the device out of service, replacing a malfunctioning component, and placing the device back in service. A device with a failed or failing component that continues to operate may cause further damage to the device, thereby requiring replacement of additional components or possible complete replacement of the device, which results in greater maintenance costs and lower productivity while waiting for a replacement device or multiple components to arrive at a facility.

In order to detect device failures or imminent device failures as early as possible, existing anomaly detection systems may periodically receive and store current operational data from one or more sensors monitoring one or more operational aspects of the device. Over time, the stored operational data may utilize a large amount of data storage capacity on an order of, for example, megabytes, gigabytes, terabytes, or other large amount of data storage capacity. The stored operational data may be analyzed to determine whether anomalies occurred that indicate a device failure or an impending device failure. Due to a large number of operational data being stored and analyzed, high processor utilization may occur leading to increased latency of processes for detecting device failures or impending device failures as well as other executing processes.

SUMMARY

According to an embodiment, a computer-implemented method is provided for optimizing anomaly detection regarding operation of a device. A computing device periodically receives, for each respective reporting period, a measured value related to operation of the device. In response to determining that the measured value indicates unhealthy operation of the device, the computing device determines a distance of the measured value from a predetermined abnormal threshold, stores the determined distance in a data store, determines a number of most recent reporting periods to include in a window based on the determined distance, deletes from the data store all stored distances determined from measured values received before the most recent reporting periods included in the window, determines an occurrence of a failure with respect to the device based on the stored distances remaining in the data store, and responsive to determining the occurrence of a failure, performing an action regarding the failure. The deleting from the data store of all of the stored distances determined from the measured values received before the most recent reporting periods included in the window minimizes use of the data store, optimizes failure detection accuracy, decreases latency, and improves processor utilization.

According to a second embodiment, a system is provided for optimizing anomaly detection regarding operation of a device. The system includes at least one processor and a memory connected to the at least one processor. The at least one processor is configured to perform a number of steps. According to the steps, a measured value related to operation of the device is periodically received for each respective reporting period. When the measured value indicates unhealthy operation of the device, a distance of the measured value from a predetermined abnormal threshold is determined and stored in a data store. A number of most recent reporting periods to include in a window is determined based on the determined distance. All stored distances determined from measured values received before the most recent reporting periods included in the window are deleted from the data store. An occurrence of a failure with respect to the device is determined based on the stored distances remaining in the data store. In response to determining the failure, an action is performed regarding the failure. The deleting from the data store of all of the stored distances determined from the measured values received before the most recent reporting periods included in the window minimizes use of the data store, optimizes failure detection accuracy, decreases latency, and improves processor utilization.

According to a third embodiment, at least one computer-readable storage device is provided that has instructions recorded therein for at least one processor to optimize anomaly detection regarding operation of a device. Execution of the instructions by the at least one processor causes the at least one processor to be configured to perform a number of steps. According to the steps, a measured value related to operation of the device is periodically received for each respective reporting period. In response to determining that the measured indicates unhealthy operation of the device, a distance of the measured value from a predetermined abnormal threshold is determined and stored in a data store. A number of most recent reporting periods to include in a window is determined based on the determined distance. All stored distances determined from measured values received before the most recent reporting periods included in the window are deleted from the data store. An occurrence of a failure with respect to the device is determined based on the stored distances remaining in the data store. Responsive to determining the occurrence of the failure, an action regarding the failure is performed. The deleting from the data store of all of the stored distances determined from the measured values received before the most recent reporting periods included in the window minimizes use of the data store, optimizes failure detection accuracy, decreases latency, and improves processor utilization.

BRIEF DESCRIPTION OF THE DRAWINGS

Generally, like reference numerals in the various figures are utilized to designate like components.

DETAILED DESCRIPTION

Figure 1:
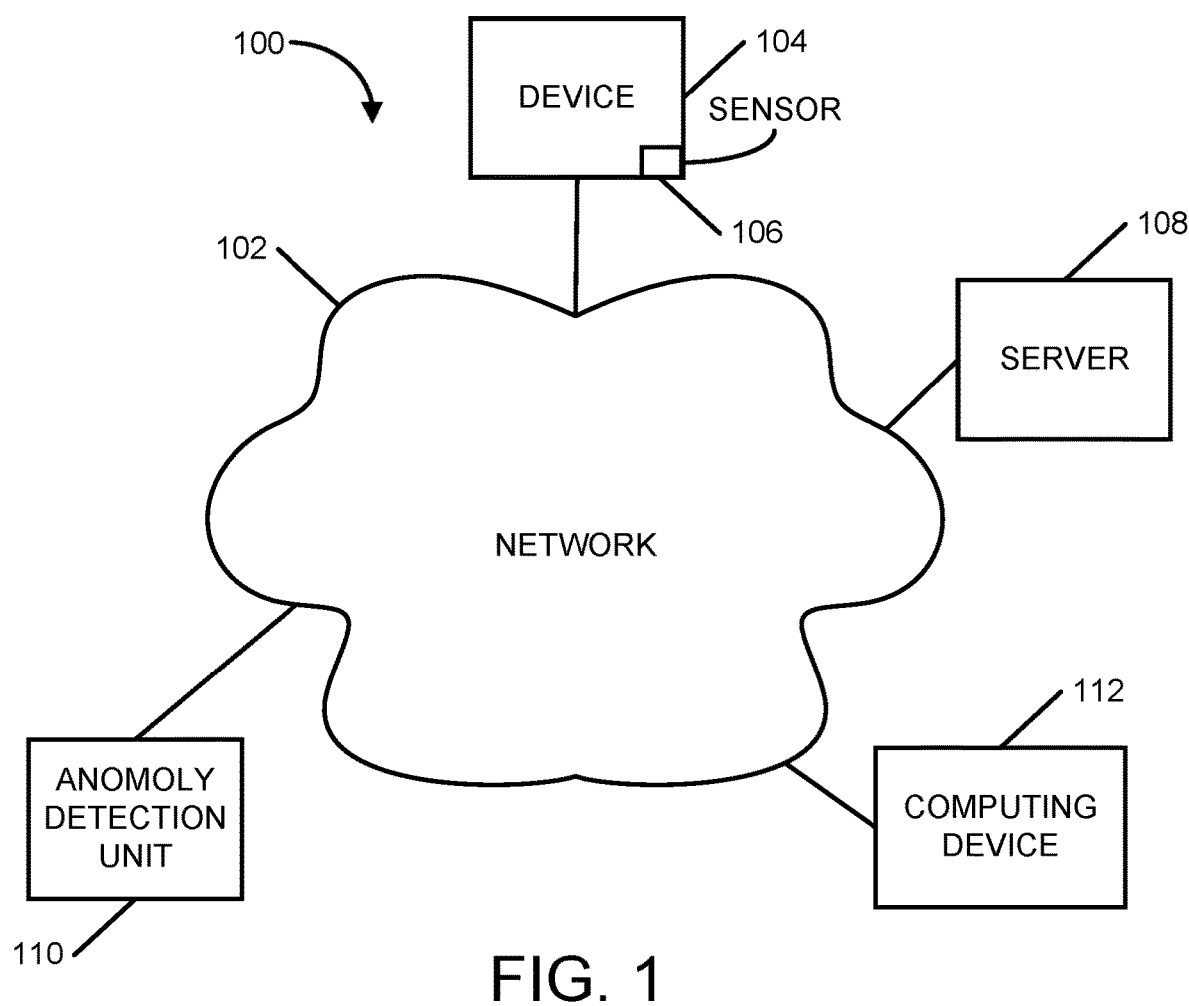
FIG. 1 illustrates an example operating environment according to various embodiments.

FIG. 1 illustrates an example environment 100 in which various embodiments may operate. Environment 100 may include a network 102, a sensor 106 monitoring at least one operating condition of a device 104, at least one server 108, anomaly detection unit 110, and a computing device 112.

Network 102 may be a wired or wireless network and may be implemented by any number of suitable communication media such as, for example, a packet-switched data network (PSDN), a radio frequency network, a satellite communication network, a network of networks such as the Internet, a company intranet, other types of networks, or a combination of various types of networks.

Device 104 may be a device with a sensor 106 that periodically reports an operational condition of device 104. Sensor 106 may have a wireless connection with server 108 via network 102. The wireless connection may be via a Wireless Fidelity (WiFi) connection, a Bluetooth® (Bluetooth is a registered trademark of Bluetooth Sig, Inc., a Delaware corporation) connection, or another type of wireless connection to network 102. In some embodiments, device 104 may be connected to network 102 via a wireless or wired connection. In at least some embodiments, device 104 may include, but not be limited to a pump, and sensor 106 may include, but not be limited to an accelerometer or other type of sensor. In some embodiments, sensor 106 may be an Internet of Things (IoT) device.

Sensor 106 may periodically provide current operational data such as, for example, acceleration of a component of device 104, or other operational data to server 108. In addition, a logistic controller (not shown) of device 104 may periodically provide operational data such as, for example, revolutions per minute (RPM) and/or other operational data regarding device 104 to server 108 via network 102.

Server 108 may include multiple servers such as, for example, a server farm. In some embodiments, server 108 may include multiple servers in a hub and spoke configuration. Server 108 may provide the reported operational data to anomaly detection unit 110 via network 102. In some embodiments, server 108 may include a Message Queuing Telemetry Transport (MQTT) broker to receive the periodic reporting of operational data with respect to operation of device 104 and to provide, when requested by anomaly detection unit 110, the reported operational data to anomaly detection unit 110 via network 102. In embodiments in which server 108 includes the MQTT broker, server 108 may provide operational data received during a single respective reporting interval to anomaly detection unit 110 for each request for operational data received from anomaly detection unit 110.

When anomaly detection unit 110 detects a failure or an impending failure of device 104, anomaly detection unit 110 may send a failure notification to computing device 112 via network 102. Computing device 112 may indicate the failure or the impending failure via a display or via other means such as, for example, an audio notification including, but not limited to an alarm and/or an audio announcement, which may include information identifying failing device 104. In some embodiments, anomaly detection unit 110 may send a command to a controller of device 104 to cause a powering down of device 104 when the failure or the impending failure is detected.

Alternatively, instead of anomaly detection unit 110 sending a failure notification to computing device 112, anomaly detection device 110 may be configured to indicate the failure or the impending failure via a display of anomaly detection unit 110 or via other means such as, for example, an audio notification including, but not limited to an alarm or an audio announcement, which may providing information regarding identification of the failed or failing device 104.

Figure 2:
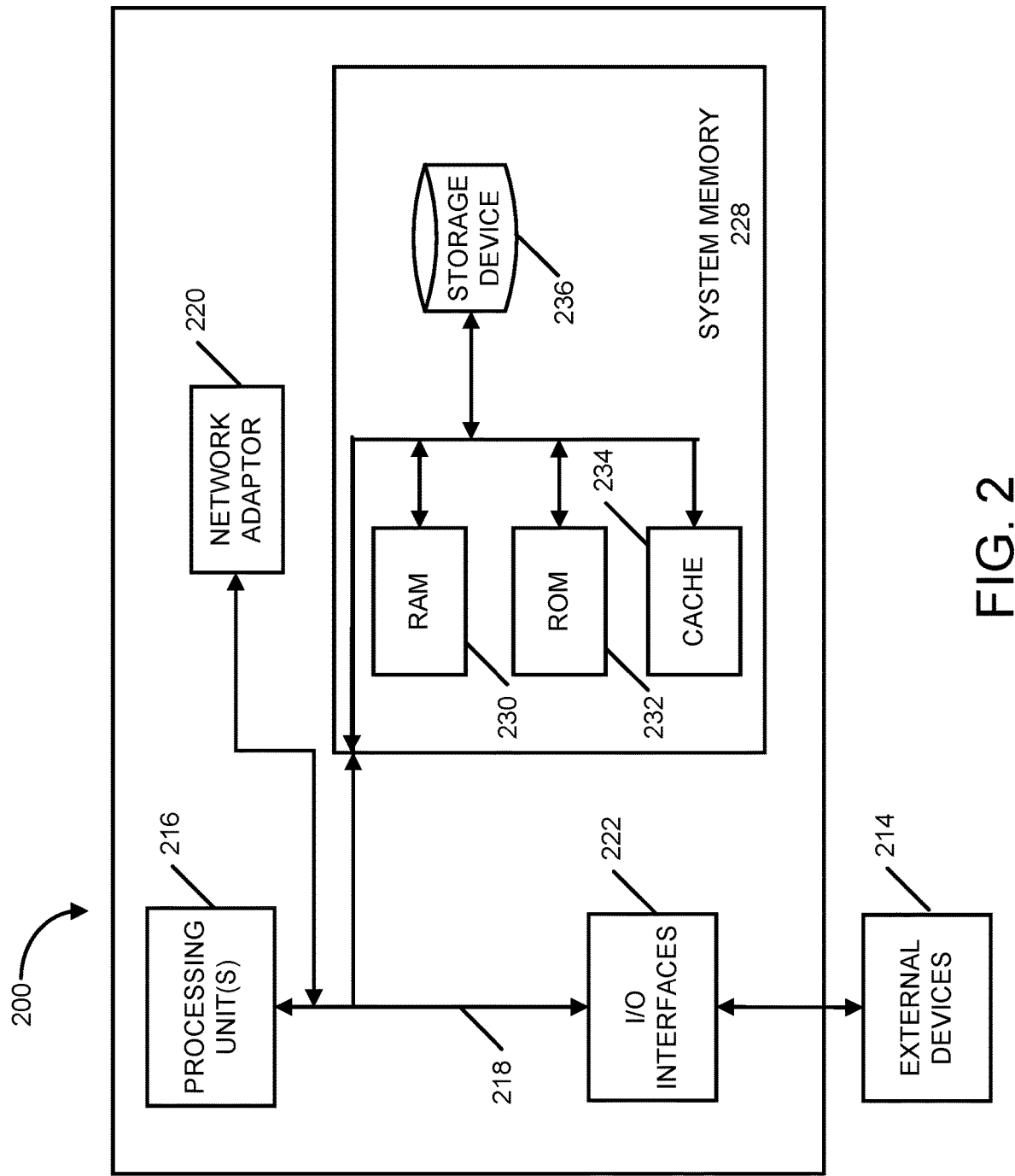
FIG. 2 is a functional block diagram of a general-purpose computer which may implement the various embodiments.

FIG. 2 illustrates an example computing system 200 that may implement any of server 108, anomaly detection unit 110, and/or computing device 112. Computing system 200 is shown in a form of a general-purpose computing device. Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various computer system readable media, which may be any available media accessible by computing system 200. The computer system readable media may include volatile and non-volatile media as well as removable and non-removable media.

System memory 228 may include volatile memory, such as random access memory (RAM) 230 and cache memory 234. System memory 228 also may include non-volatile memory including, but not limited to, read-only memory (ROM) 232 and storage system 236. Storage system 236 may be provided for reading from and writing to a non-removable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments of the invention. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, a network card, modem, etc. that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
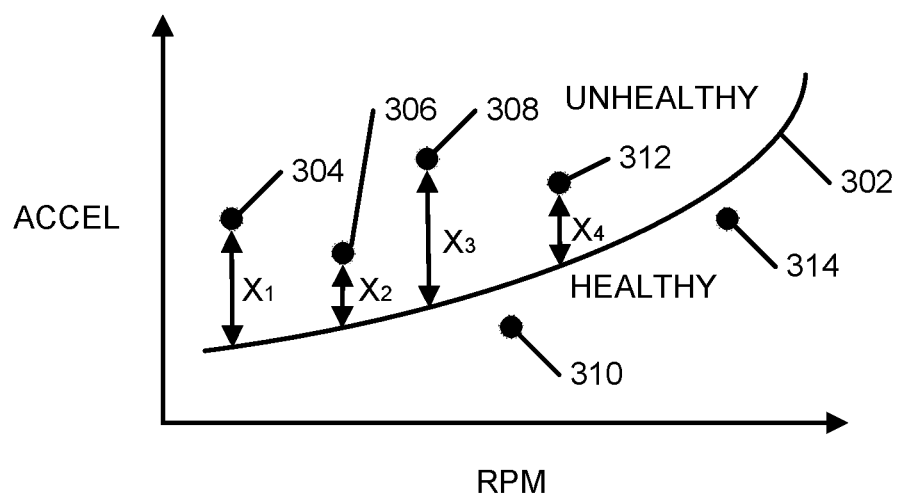
FIG. 3 shows example data points, including respective received measured values, on a graph and distances of unhealthy data points from an abnormal threshold.

As mentioned previously, anomaly detection unit 110 may periodically receive the operational data including, but not limited to, acceleration regarding at least a component of a device and RPM. The operational data may be received every predetermined time interval. FIG. 3 shows on a graph example received data points 304-314, received during respective reporting periods. In this example, the data points represent acceleration at respective values of RPM reported for a device. Using a supervised machine learning technique including, but not limited to, logistic regression, a machine learning model may be trained to classify data points as either healthy or unhealthy based on known training data including periodically collected data points regarding operation data of similar or identical devices, some of which may be known to be operating in an impending or current failure condition and others of which are known to be operating in a normal operating condition. Using an initial machine learning model and training data, the machine learning model may classify a collected data point as being either healthy or unhealthy, where a healthy data point represents a healthy operating condition for the device and an unhealthy data point represents an operating anomaly with respect to the device, During training, predicted classifications made by the machine learning model are compared with the actual classifications included in the training data. After each training cycle, if the predicted classifications are not within a desired amount of accuracy of the actual classifications, an adjustment is made to the machine learning model to improve accuracy of the predicted classifications. Adjustments to the machine learning model may be made after each training cycle using the training data until the machine learning model achieves a desired amount of accuracy regarding the predicted classifications. FIG. 3 includes curve 302, which may be derived from a machine learning model trained using a supervised machine learning technique, represents values of an abnormal threshold at various RPMs. As shown in FIG. 3, data points appearing above curve 302 may be classified as unhealthy, while data points 310, 314 appearing below curve 302 may be classified as healthy. Thus, in this example, each of data points 304, 306, 308, 312 was collected at respective RPM values and has a corresponding acceleration value, each of which is greater than an abnormal acceleration threshold at the respective RPM value on curve 302. Data points 304, 306, 308, 312, respectively have distances of $X_1$, $X_2$, $X_3$ and $X_4$ between acceleration at the respective data point and a corresponding abnormal threshold value of acceleration at an RPM value corresponding to the respective data point.

Figure 4:
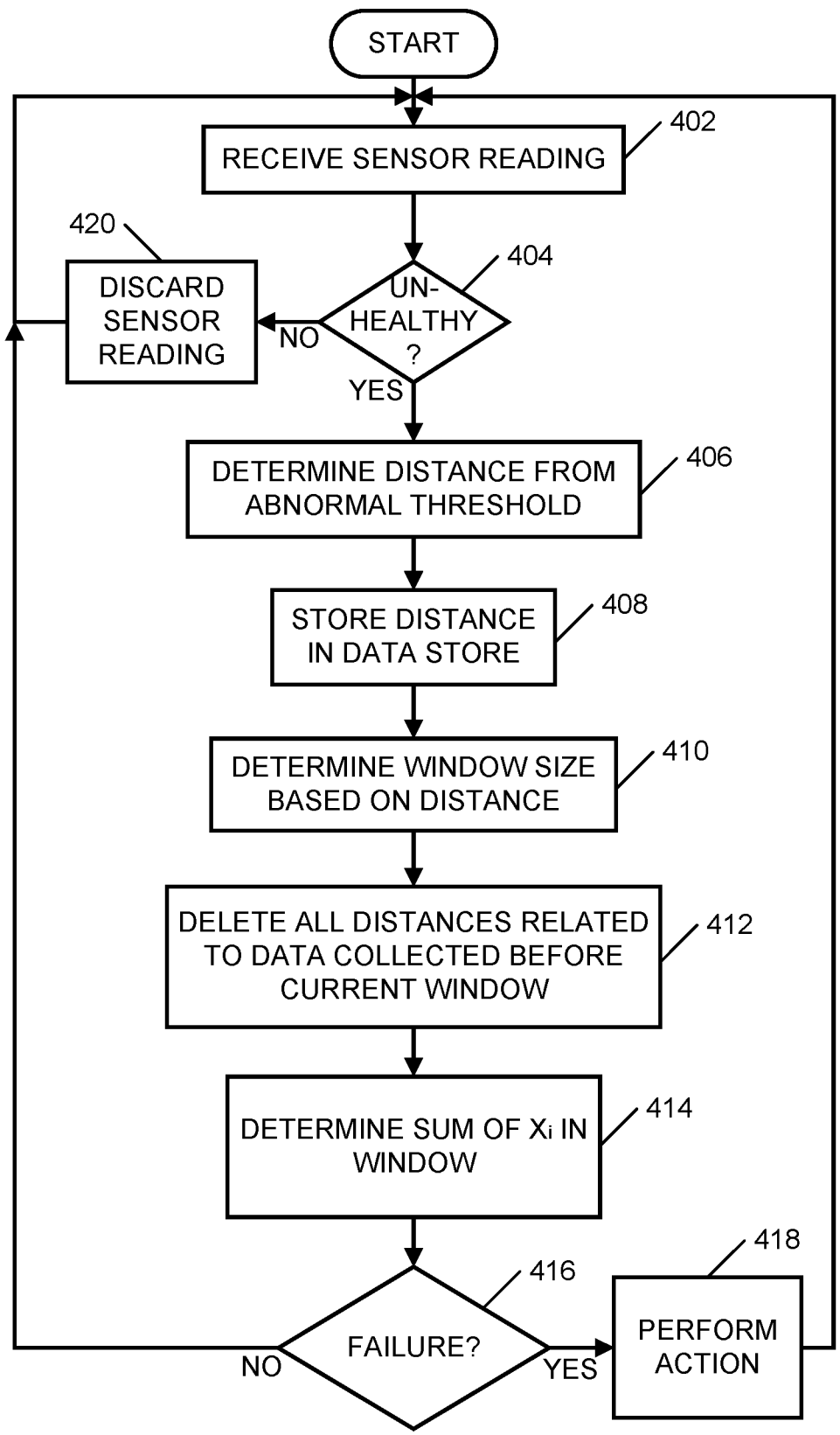
FIG. 4 is a flowchart of an example process that may be performed in various embodiments for determining a device failure.

FIG. 4 is a flowchart of an example process that may be performed by anomaly detection unit 110 in various embodiments. The process may begin with receiving a sensor reading from a sensor monitoring an operational condition of a device (act 402). The operational condition may include, but not be limited to, a value for acceleration with respect to at least one component of the device. Further, in some embodiments a value of another operational condition with respect to the device may be received from a logistic controller of the device. In some of the embodiments, the another operational condition may be RPM and the device may be a pump.

Next, a model that may have been previously trained via supervised machine learning may classify the sensor reading, or data point, as being either healthy or unhealthy. If, during act 404, the data point is determined to be classified as not unhealthy, then the data point may be discarded and a next data point may be received (act 402).

If the data point is determined to be classified as unhealthy, a distance between a value of operational data such as acceleration or other operational data, represented by the data point, to a value of acceleration or other operational data at an abnormal threshold for a corresponding value of RPM or other corresponding data may be determined (act 406). Thus, for example, if the abnormal threshold is a value for acceleration at the corresponding value of RPM, then the distance of the data point from the abnormal threshold may be determined according to |(acceleration at data point)–(acceleration at abnormal threshold for corresponding RPM)|. The determined distance then may be stored in a data store (act 408).

Next, anomaly detection unit 110 may determine a window size of most recent reporting periods from which a failure or impending failure of the device may be determined (act 410). The window size may be determined based on the determined distance of the most recently received data point from the abnormal threshold. In some embodiments, the determined window size may be larger when the determined distance of the most recently received data point from the abnormal threshold is small in comparison to a determined window size when the determined distance is large.

In some embodiments, there is an angle, θ, formed by a line that is parallel to a vertical axis on a graph and that passes through the data point and another line passing through the data point that intersects with the horizontal axis, thereby determining the window size. The angle, θ, and therefore the window size, may be optimized by using labeled data and a maximum likelihood estimation method to iteratively move θ toward its optimal value for the height of the data point above the abnormal threshold.

After determining the window size of most recent reporting periods, all distances stored in the data store that are related to data received before the window size of most recent reporting periods may be deleted from the data store, thereby freeing up a portion of the data store (act 412).

Anomaly detection unit 110 may determine a sum of the distances from the abnormal threshold for the unhealthy data points that were received in the window of most recently received reporting periods (act 414). Anomaly detection unit 110 may then determine whether a failure occurred or an impending failure is about to occur based on the sum of the distances from the abnormal threshold of the data points in the most recently received window of unhealthy data points (act 416). In some embodiments, a failure or impending failure is detected based on the sum of the distances from the abnormal threshold of each unhealthy data point received during the window of most recently received reporting periods. For example, the failure or the impending failure may be determined based on $\Sigma_{\forall Xi\ in\ window}(Xi) > \alpha$, where $X_i$ is a distance from an abnormal threshold for an unhealthy data point in the window and a value of a is optimized based on supervised machine learning. In some embodiments, specific characteristics of each of the unhealthy data points received during the window also may be used in addition to the distances above the abnormal threshold to determine the failure or the impending failure. An example of a specific characteristic may include, but not be limited to, a fast Fourier transform of vibration bursts.

If a failure or impending failure is detected, during act 416, then an action may be performed. In some embodiments, the action may include one or more of providing a notification to a computing device, sounding an audio alarm, making a voice announcement, stopping operation of the device, etc.

Occasionally, anomalies may be observed only at certain times of a reporting time interval such as, for example, near a beginning or an end of a reporting time interval, but not exactly at a reporting time. Analysis of data points reported at exactly predetermined time intervals may miss detecting such anomalies. To address this problem, in some embodiments operational data of the device being monitored may be reported at different variations of a predefined time interval. For example, if reporting time periods are configured to occur every defined period of time, such as once each minute, in some embodiments the next reporting time may be adjusted by a random amount of time. For example, the random amount of time may be adjusted by increasing or decreasing the time interval for reporting of operational data by, for example, a sensor monitoring the device or a logistic controller of the device. In some embodiments, the amount of the increase or decrease may vary randomly within a predefined percentage of the time interval. For example, if the reporting time periods are configured to occur every minute and a predefined percentage for varying the time period is 20%, then the sensor and/or the logistic controller may provide a next reading of operational data in one minute±β, where β may be a number of time units such as, for example, seconds or another unit of time. In this example, 20% of one minute is twelve seconds. Thus, $-12 \leq \beta \leq +12$ and the unit of time may be in seconds. In this example, a random number generator may be used to generate a random value in a range from −12 to +12. Thus, according to this example, a next time interval for reporting may occur in a range of 48 to 72 seconds after a last time interval for reporting. In other embodiments, the reporting time interval may be set to a different percentage variation or to a specific random number range within expiration of a different fixed time interval.

In the embodiments described above acceleration with respect to a value of RPM may be reported with respect to a device at each reporting time period. In other embodiments, values of other operational conditions of a device may be reported at each reporting time interval such as, for example: amount of movement of a component during operation; a condition of a valve and seat on a fluid end for a hydraulic fracturing, positive displacement pump; a condition of a packing seal on a fluid end for a hydraulic fracturing, positive displacement pump; a condition of a pinion bull gear on a power end (drive/motor) for a hydraulic fracturing, positive displacement pump; a condition of a bearing on a power end (drive/motor) for a hydraulic fracturing, positive displacement pump; etc. Other operational conditions that may be recorded include, but are not limited to, degree of rotation for a pump, suction side pressure for an inlet of a pump, discharge pressure for an outlet of a pump, and oil pressure. Although device 104 is described as possibly including a pump, in other embodiments, device 104 may include any type of device that performs an operation that can be monitored.

Various embodiments provide a number of advantages over existing systems and methods for detecting operational anomalies of various devices. For example, by deleting stored data related to operational data collected before a window of most recently collected unhealthy operational data, huge amounts of data storage are not tied up storing the data, and instead, are available for other uses. Further, the various embodiments improve processor utilization because only a limited number of most recently collected unhealthy operational data points are analyzed to determine whether a device is failing or is about to fail. Test results of various embodiments detected failing devices 90% of the time without requiring collection of huge amounts of data such as, for example, hundreds of data points. This is a significant improvement over detecting failed devices approximately 60% of the time by analyzing huge amounts of collected data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The term "failure" in this specification is defined to include a device failure as well as an impending device failure. The term "impending failure" refers to a condition in which a device is still operational, but is exhibiting behavior that indicates that a device failure will soon occur, thereby making the device inoperable for its intended purpose.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed, Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods, apparatus (systems and computer-readable storage devices having instructions stored therein for carrying out functions according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A computer-implemented method of optimizing anomaly detection with respect to operation of a device, the computer-implemented method comprising:
periodically receiving, by a computing device, a measured value related to operation of the device;
responsive to determining, by the computing device, that the measured value indicates unhealthy operation of the device:
determining, by the computing device, a distance of the measured value from a predetermined abnormal threshold,
storing, by the computing device, the determined distance in a data store,
determining, by the computing device, a number of most recent reporting periods to include in a window based on the determined distance,
deleting from the data store, by the computing device, all stored distances determined from measured values received before the most recent reporting periods included in the window,
determining, by the computing device, an occurrence of a failure with respect to the device based on the stored distances remaining in the data store after the deleting, and
responsive to determining the occurrence of the failure, performing an action regarding the failure, wherein:
the deleting step minimizes use of the data store, optimizes failure detection accuracy, decreases latency, and improves processor utilization.

2. The computer-implemented method of claim 1, further comprising:
responsive to determining that the measured value indicates healthy operation of the device:
discarding the measured value.

3. The computer-implemented method of claim 1, wherein respective measured values are sampled within a random variation of predefined constant time intervals.

4. The computer-implemented method of claim 1, wherein:
the measured value includes acceleration of at least one component of the device, and
the distance is an amount by which the acceleration varies from the predetermined abnormal threshold.

5. The computer-implemented method of claim 4, further comprising:
receiving a value of revolutions per minute of the at least one component of the device for the each respective reporting period, wherein:
a value of the predetermined abnormal threshold changes based on the value of the revolutions per minute.

6. The computer-implemented method of claim 1, wherein the determining of the occurrence of the failure further comprises:
determining a sum of the determined distances remaining in the data store; and
determining the occurrence of the failure when a value of the sum exceeds a predetermined value.

7. The computer-implemented method of claim 1, wherein:
the action regarding the failure includes at least one from a group including providing a notification regarding the failure and automatically stopping operation of the device.

8. A system for optimizing anomaly detection with respect to operation of a device, the system comprising:
at least one processor; and
a memory connected to the at least one processor, the at least one processor being configured to perform:
periodically receiving a measured value related to operation of the device;
responsive to determining that the measured value indicates unhealthy operation of the device:
determining a distance of the measured value from a predetermined abnormal threshold;
storing the determined distance in a data store;
determining a number of most recent reporting periods to include in a window based on the determined distance;

deleting from the data store all stored distances determined from measured values received before the most recent reporting periods included in the window;

determining an occurrence of a failure with respect to the device based on the stored distances remaining in the data store after the deleting; and responsive to determining the occurrence of the failure, performing an action regarding the failure, wherein:

the deleting step minimizes use of the data store, optimizes failure detection accuracy, decreases latency, and improves processor utilization.

9. The system of claim 8, wherein the at least one processor is further configured to:

discard the measured value in response to determining that the measured value indicates healthy operation of the device.

10. The system of claim 8, wherein respective measured values are sampled within a random variation of predefined constant time intervals.

11. The system of claim 8, wherein:

the measured value includes acceleration of at least one component of the device, and the distance is an amount by which the acceleration varies from the predetermined abnormal threshold.

12. The system of claim 11, wherein the at least one processor is further configured to perform:

receiving a value of revolutions per minute of the at least one component of the device for the each respective reporting period, wherein:

a value of the predetermined abnormal threshold changes based on the value of the revolutions per minute.

13. The system of claim 8, wherein the determining of the occurrence of the failure further comprises:

determining a sum of the determined distances remaining in the data store; and determining the occurrence of the failure when a value of the sum exceeds a predetermined value.

14. The system of claim 8, wherein:

the action regarding the failure includes at least one from a group including providing a notification regarding the failure and automatically stopping operation of the device.

15. At least one non-transitory computer-readable storage device having instructions stored therein for at least one processor to optimize anomaly detection with respect to operation of a device, execution of the instructions by the at least one processor causing the at least one processor to be configured to perform:

periodically receiving a measured value related to operation of the device;

responsive to determining that the measured value indicates unhealthy operation of the device:

determining a distance of the measured value from a predetermined abnormal threshold, storing the determined distance in a data store, determining a number of most recent reporting periods to include in a window based on the determined distance, deleting, from the data store, all stored distances determined from measured values received before the most recent reporting periods included in the window;

determining an occurrence of a failure with respect to the device based on the stored distances remaining in the data store after the deleting; and responsive to determining the occurrence of the failure, performing an action regarding the failure, wherein:

the deleting step minimizes use of the data store, optimizes failure detection accuracy, decreases latency, and improves processor utilization.

16. The at least one non-transitory computer-readable storage device of claim 15, wherein the execution of the instructions by the at least one processor further causes the at least one processor to be configured to perform:

discarding the measured value responsive to determining that the measured value indicates healthy operation of the device.

17. The at least one non-transitory computer-readable storage device of claim 15, wherein:

the measured value includes a first numerical value related to operation of the at least one component of the device, and the distance is an amount by which the first numerical value varies from the predetermined abnormal threshold.

18. The at least one non-transitory computer-readable storage device of claim 17, wherein a value of the predetermined abnormal threshold depends on a received second measured numerical value related to operation of the device.

19. The at least one non-transitory computer-readable storage device of claim 15, wherein the determining of the occurrence of the failure further comprises:

determining a sum of the determined distances remaining in the data store; and determining the occurrence of the failure when a value of the sum exceeds a predetermined value.

20. The at least one non-transitory computer-readable storage device of claim 15, wherein:

the action regarding the failure includes at least one from a group including providing a notification regarding the failure and automatically stopping operation of the device.

* * * * *